United States Patent
Hoskin et al.

(10) Patent No.: US 10,577,940 B2
(45) Date of Patent: Mar. 3, 2020

(54) TURBOMACHINE ROTOR BLADE

(71) Applicant: General Electric Company, Schenectady, NY (US)

(72) Inventors: Robert Frank Hoskin, Duluth, GA (US); Robert Alan Brittingham, Greer, SC (US); Brian Denver Potter, Greer, SC (US); Daniel Jason Erno, Clifton Park, NY (US); John McConnell Delvaux, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 395 days.

(21) Appl. No.: 15/420,457

(22) Filed: Jan. 31, 2017

(65) Prior Publication Data

US 2018/0216469 A1    Aug. 2, 2018

(51) Int. Cl.
| | | |
|---|---|---|
| *F01D 5/16* | (2006.01) | |
| *F01D 5/14* | (2006.01) | |
| *F01D 5/22* | (2006.01) | |
| *F01D 5/26* | (2006.01) | |
| *B33Y 80/00* | (2015.01) | |

(52) U.S. Cl.
CPC ............... *F01D 5/16* (2013.01); *B33Y 80/00* (2014.12); *F01D 5/147* (2013.01); *F01D 5/225* (2013.01); *F01D 5/26* (2013.01); *F05D 2240/307* (2013.01); *F05D 2260/96* (2013.01)

(58) Field of Classification Search
CPC ..... F01D 5/00; F01D 5/10; F01D 5/16; F01D 5/22; F01D 5/147; F01D 5/225; F01D 5/26; F01D 25/04; F01D 25/06; F05D 2260/96

See application file for complete search history.

(56) References Cited

U.S. PATENT DOCUMENTS

| | | | | |
|---|---|---|---|---|
| 2,862,686 A | * | 12/1958 | Bartlett | F01D 5/16 416/213 R |
| 2,920,868 A | * | 1/1960 | Ackerman | F01D 5/282 416/229 A |
| 3,719,432 A | * | 3/1973 | Musick | F01D 5/22 416/190 |
| 3,986,792 A | * | 10/1976 | Warner | F01D 5/225 416/190 |
| 4,097,192 A | * | 6/1978 | Kulina | F01D 5/14 416/175 |

(Continued)

FOREIGN PATENT DOCUMENTS

| | | |
|---|---|---|
| DE | 102010046579 A1 | 3/2012 |
| EP | 1980715 A1 | 10/2008 |

(Continued)

OTHER PUBLICATIONS

Additive Manufacturing in Aerospace and Defense, Roland Berger, May 2017 (Year: 2017).*

*Primary Examiner* — Kenneth J Hansen
*Assistant Examiner* — Maranatha Boardman
(74) *Attorney, Agent, or Firm* — Dority & Manning, P.A.

(57) ABSTRACT

A rotor blade for a turbomachine includes an airfoil having a leading edge, a trailing edge, a root, and a tip. The airfoil defines a chord extending from the leading edge to the trailing edge and a span extending from the root to the tip. A first particle-filled damper is positioned within the airfoil between fifty percent of the chord and one hundred percent of the chord.

20 Claims, 8 Drawing Sheets

(56) References Cited

U.S. PATENT DOCUMENTS

| | | | |
|---|---|---|---|
| 4,722,668 A * | 2/1988 | Novacek | F01D 5/22 416/190 |
| 5,165,860 A * | 11/1992 | Stoner | F01D 5/26 416/224 |
| 5,232,344 A * | 8/1993 | El-Aini | F01D 5/16 416/145 |
| 5,522,705 A * | 6/1996 | Elaini | F01D 5/225 416/190 |
| 5,599,165 A * | 2/1997 | Elaini | F01D 5/225 416/190 |
| 5,820,343 A | 10/1998 | Kraft et al. | |
| 5,820,348 A | 10/1998 | Fricke | |
| 5,829,955 A | 11/1998 | Saito et al. | |
| 5,947,688 A * | 9/1999 | Schilling | F01D 5/147 416/233 |
| 6,059,533 A | 5/2000 | Stoker et al. | |
| 6,224,341 B1 | 5/2001 | Fricke | |
| 6,237,302 B1 | 5/2001 | Fricke | |
| 6,371,727 B1 | 4/2002 | Stangeland et al. | |
| 6,547,049 B1 | 4/2003 | Tomlinson | |
| 6,568,908 B2 * | 5/2003 | Namura | F01D 5/16 416/190 |
| 6,827,551 B1 * | 12/2004 | Duffy | F01D 5/16 415/119 |
| 6,979,180 B2 | 12/2005 | Motherwell | |
| 7,001,152 B2 | 2/2006 | Paquet et al. | |
| 7,017,706 B2 | 3/2006 | Brown et al. | |
| 7,070,390 B2 | 7/2006 | Powell | |
| 7,250,224 B2 | 7/2007 | Darolia et al. | |
| 7,347,664 B2 | 3/2008 | Kayser et al. | |
| 7,762,779 B2 | 7/2010 | Zemitis et al. | |
| 7,955,054 B2 | 6/2011 | El-Aini et al. | |
| 7,988,412 B2 | 8/2011 | Hardwicke et al. | |
| 7,997,857 B2 | 8/2011 | Bättig et al. | |
| 8,017,195 B2 | 9/2011 | Darolia et al. | |
| 8,105,039 B1 * | 1/2012 | El-Aini | F01D 11/008 416/195 |
| 8,157,507 B1 | 4/2012 | Coffin et al. | |
| 8,172,541 B2 | 5/2012 | Cairo | |
| 8,182,228 B2 | 5/2012 | Riley et al. | |
| 8,225,506 B2 * | 7/2012 | Chivers | F01D 5/147 264/261 |
| 8,267,662 B2 | 9/2012 | Patrick et al. | |
| 8,579,593 B2 | 11/2013 | Campbell et al. | |
| 8,807,928 B2 | 8/2014 | Kareff et al. | |
| 8,915,718 B2 | 12/2014 | Dolansky et al. | |
| 8,978,250 B2 | 3/2015 | Barcock et al. | |
| 9,121,286 B2 | 9/2015 | Dolansky et al. | |
| 9,181,806 B2 | 11/2015 | Propheter-Hinckley et al. | |
| 9,194,238 B2 | 11/2015 | Roberts, III et al. | |
| 9,249,668 B2 | 2/2016 | Fisk et al. | |
| 9,267,380 B2 | 2/2016 | Houston et al. | |
| 9,328,619 B2 | 5/2016 | Chouhan | |
| 9,334,740 B2 | 5/2016 | Kellerer et al. | |
| 9,470,095 B2 | 10/2016 | Propheter-Hinckley et al. | |
| 9,957,824 B2 * | 5/2018 | Klinetob | F01D 5/16 |
| 10,041,359 B2 * | 8/2018 | Brandl | F01D 5/147 |
| 2010/0028133 A1 * | 2/2010 | Delvaux | F01D 5/10 415/119 |
| 2013/0058785 A1 * | 3/2013 | Kellerer | F01D 5/16 416/1 |
| 2013/0294891 A1 | 11/2013 | Neuhaeusler et al. | |
| 2014/0119923 A1 | 5/2014 | Chouhan | |
| 2014/0141175 A1 | 5/2014 | Willson et al. | |
| 2014/0234110 A1 | 8/2014 | Puram et al. | |
| 2015/0052898 A1 | 2/2015 | Erno et al. | |
| 2015/0064010 A1 | 3/2015 | Zhang et al. | |
| 2015/0361801 A1 | 12/2015 | Blaney et al. | |
| 2016/0130953 A1 * | 5/2016 | Brandl | F01D 5/147 416/95 |
| 2016/0341221 A1 * | 11/2016 | Twelves, Jr. | F01D 5/16 |

FOREIGN PATENT DOCUMENTS

| | | |
|---|---|---|
| EP | 2792434 A1 | 10/2014 |
| JP | S 6312803 A | 1/1988 |
| JP | S 6429696 A | 1/1989 |

* cited by examiner

TURBOMACHINE ROTOR BLADE

FIELD

The present disclosure generally relates to turbomachines. More particularly, the present disclosure relates to rotor blades for turbomachines.

BACKGROUND

A gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The turbine section includes a plurality of rotor blades, which extract kinetic energy and/or thermal energy from the combustion gases flowing therethrough. During operation of the gas turbine engine, the rotor blades experience vibrations, which may cause fluttering, fretting, shingling, and/or other aeromechanical issues. The amplitude of these vibrations may be greater in larger rotor blades, such as the rotor blades positioned in the final stages of the turbine section. In this respect, the aeromechanical issues caused by vibrations may limit the size of the rotor blades in the turbine section, particularly the final stages thereof.

BRIEF DESCRIPTION

Aspects and advantages of the technology will be set forth in part in the following description, or may be obvious from the description, or may be learned through practice of the technology.

In one aspect, the present disclosure is directed to a rotor blade for a turbomachine. The rotor blade includes an airfoil having a leading edge, a trailing edge, a root, and a tip. The airfoil defines a chord extending from the leading edge to the trailing edge and a span extending from the root to the tip. A first particle-filled damper is positioned within the airfoil between fifty percent of the chord and one hundred percent of the chord.

In another aspect, the present disclosure is directed to a turbomachine having a compressor section, a combustion section, and a turbine section including one or more rotor blades. Each rotor blade includes an airfoil having a leading edge, a trailing edge, a root, and a tip. The airfoil defines a chord extending from the leading edge to the trailing edge and a span extending from the root to the tip. A first particle-filled damper is positioned within the airfoil between fifty percent of the chord and one hundred percent of the chord.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
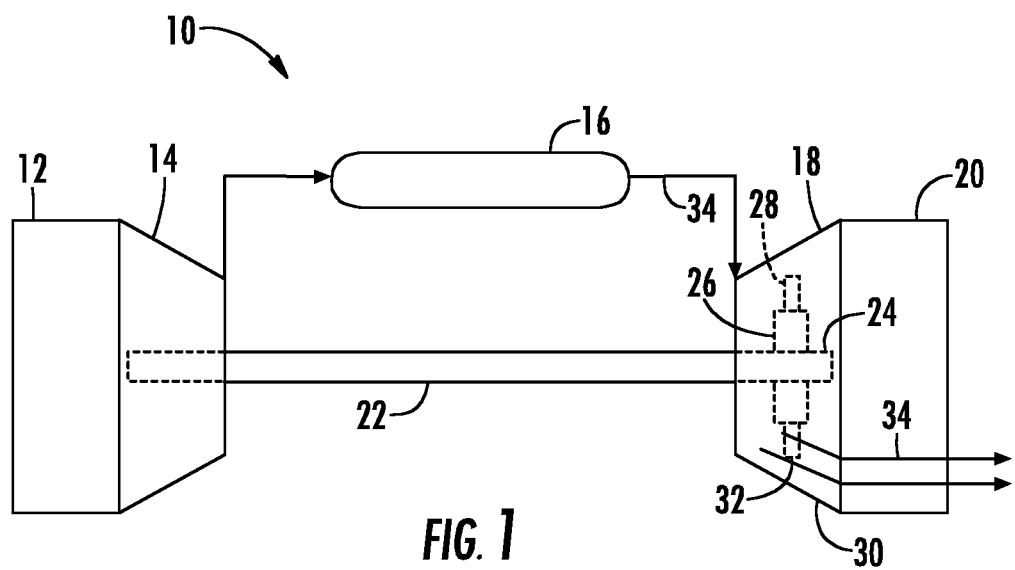
FIG. 1 is a schematic view of an exemplary gas turbine engine that may incorporate various embodiments disclosed herein.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Although an industrial or land-based gas turbine is shown and described herein, the present technology as shown and described herein is not limited to a land-based and/or industrial gas turbine unless otherwise specified in the claims. For example, the technology as described herein may be used in any type of turbomachine including, but not limited to, aviation gas turbines (e.g., turbofans, etc.), steam turbines, and marine gas turbines.

Referring now to the drawings, wherein identical numerals indicate the same elements throughout the figures, FIG. 1 schematically illustrates a gas turbine engine 10. As mentioned above, the turbine engine 10 of the present disclosure need not be a gas turbine engine, but rather may be any suitable turbomachine, such as a steam turbine engine. The gas turbine engine 10 may include an inlet section 12, a compressor section 14, a combustion section 16, a turbine section 18, and an exhaust section 20. The compressor section 14 and turbine section 18 may be coupled by a shaft 22. The shaft 22 may be a single shaft or a plurality of shaft segments coupled together to form the shaft 22.

The turbine section 18 may generally include a rotor shaft 24 having a plurality of rotor disks 26 (one of which is shown). A plurality of rotor blades 28 extends radially outwardly from and is interconnected to the rotor disk 26. Each rotor disk 26 in turn, may be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, air flows through the inlet section 12 and into the compressor section 14, where the air is progressively compressed to provide pressurized air to the combustors (not shown) in the combustion section 16. The pressurized air mixes with fuel and burns within each combustor to produce combustion gases 34. The combustion gases 34 flow along the hot gas path 32 from the combustion section 16 into the turbine section 18, where kinetic and/or thermal energy is transferred from the combustion gases 34 to the rotor blades 28, thereby causing the rotor shaft 24 to rotate. The mechanical rotational energy of the rotor shaft 24 may then be used to power the compressor section 14 and/or to generate electricity. The combustion gases 34 exiting the turbine section 18 may then be exhausted from the gas turbine engine 10 via the exhaust section 20.

Figure 2:
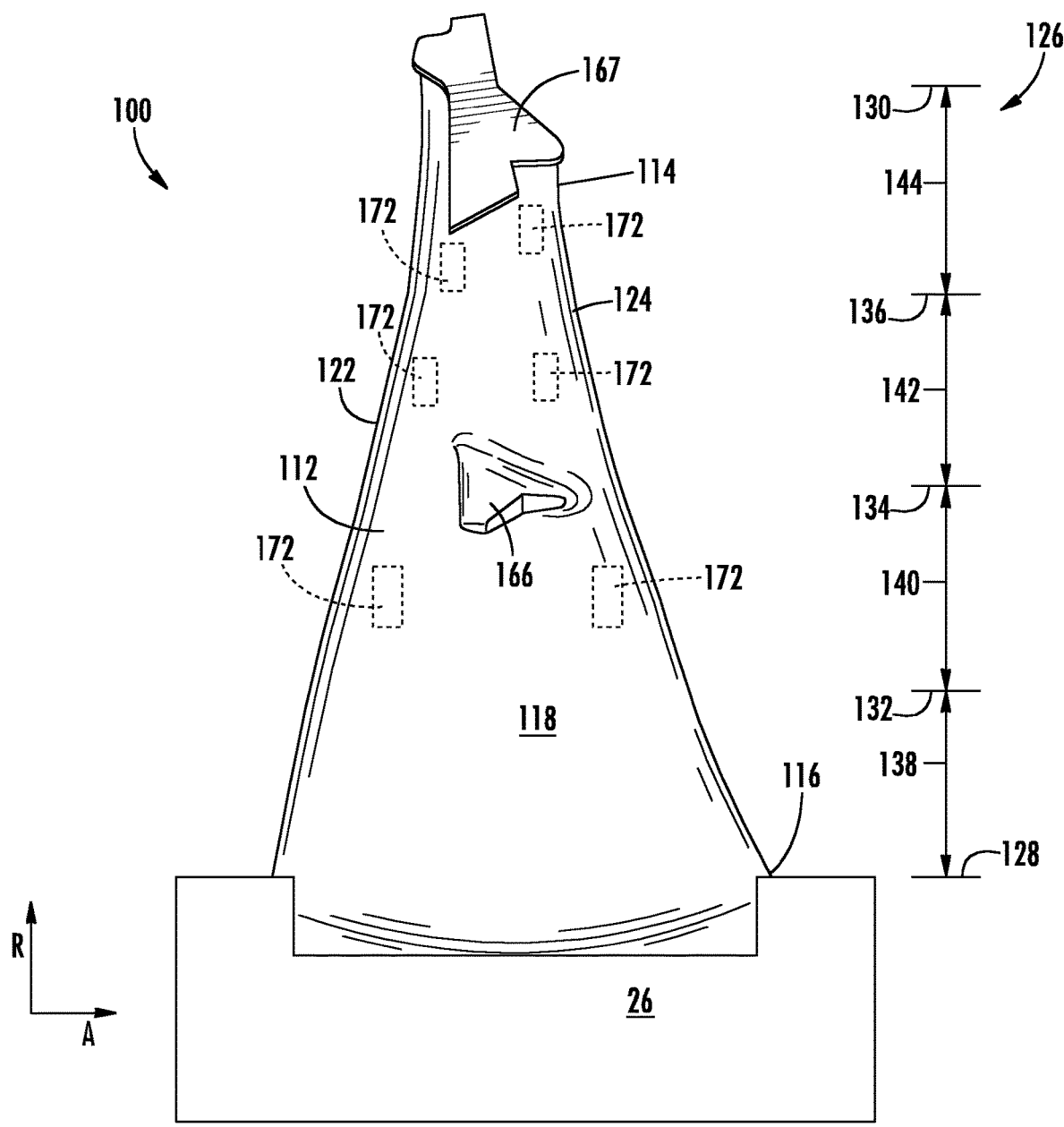
FIG. 2 is a side view of an exemplary rotor blade in accordance with the embodiments disclosed herein.

FIG. 2 is a view of an exemplary rotor blade 100, which may be incorporated into the turbine section 18 of the gas turbine engine 10 in place of the rotor blade 28 as shown in FIG. 1. As shown, the rotor blade 100 defines an axial direction A, a radial direction R, and a circumferential direction C. In general, the axial direction A extends parallel to an axial centerline 102 of the shaft 24 (FIG. 1), the radial direction R extends generally orthogonal to the axial direction A, and the circumferential direction C extends generally concentrically around the axial direction A. The rotor blade 100 may also be incorporated into the compressor section 14 of the gas turbine engine 10 (FIG. 1).

Figure 3:
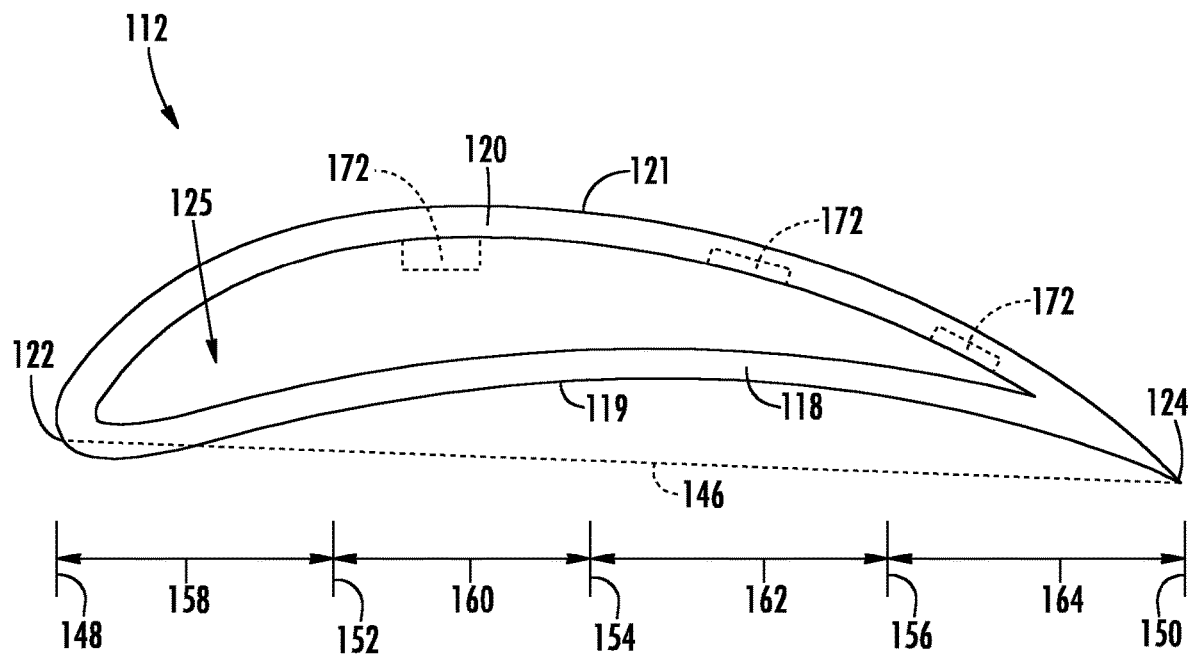
FIG. 3 is a cross-sectional view of the rotor blade shown in FIG. 2 in accordance with the embodiments disclosed herein.

Referring now to FIGS. 2 and 3, the rotor blade 100 further includes an airfoil 112. The airfoil 112 extends radially outwardly from a platform (not shown) to a tip 114. In this respect, the airfoil 112 couples to the platform at a root 116 (i.e., the intersection between the airfoil 112 and the platform). The airfoil 112 includes a pressure-side wall 118 defining a pressure-side surface 119 and an opposing suction-side wall 120 defining a suction-side surface 121. The pressure-side wall 118 and the suction-side wall 120 are joined together or interconnected at a leading edge 122 of the airfoil 112, which is oriented into the flow of combustion gases 34 (FIG. 1). The pressure-side wall 118 and the suction-side wall 120 are also joined together or interconnected at a trailing edge 124 of the airfoil 112, which is spaced downstream from the leading edge 122. The pressure-side wall 118 and the suction-side wall 120 are continuous about the leading edge 122 and the trailing edge 124. The pressure-side wall 118 is generally concave, and the suction-side wall 120 is generally convex. The pressure-side wall 118 and the suction-side wall 120 define a cavity 125 within the airfoil 112 through which cooling air may flow.

Referring particularly to FIG. 2, the airfoil 112 defines a span 126 extending from the root 116 to the tip 114. In particular, the root 116 is positioned at zero percent of the span 126, and the tip 114 is positioned at one hundred percent of the span 126. As shown in FIG. 2, zero percent of the span 126 is identified by 128, and one hundred percent of the span 126 is identified by 130. Furthermore, twenty-five percent of the span 126 is identified by 132, fifty percent of the span 126 is identified by 134, and seventy-five percent of the span 126 is identified by 136. In this respect, the span 126 may include a first quartile 138 extending from zero percent 128 of the span 126 to twenty-five percent 132 of the span 126. Similarly, the span 126 may include a second quartile 140 extending from twenty-five percent 132 of the span 126 to fifty percent 134 of the span 126. The span 126 may also include a third quartile 142 extending from fifty percent 134 of the span 126 to seventy-five percent 136 of the span 126. Furthermore, the span 126 may include a fourth quartile 144 extending from seventy-five percent 136 of the span 126 to one hundred percent 128 of the span 126.

Referring now to FIG. 3, the airfoil 112 defines a chord 146 extending from the leading edge 122 to the trailing edge 124. In particular, the leading edge 122 is positioned at zero percent of the chord 146, and the trailing edge 124 is positioned at one hundred percent of the chord 146. As shown in FIG. 3, zero percent of the chord 146 is identified by 148, and one hundred percent of the chord 146 is identified by 150. Furthermore, twenty-five percent of the chord 146 is identified by 152, fifty percent of the chord 146 is identified by 154, and seventy-five percent of the chord 146 is identified by 156. In this respect, the chord 146 may include a first quartile 158 extending from zero percent 148 of the chord 146 to twenty-five percent 152 of the chord 146. Similarly, the chord 146 may include a second quartile 160 extending from twenty-five percent 152 of the chord 146 to fifty percent 154 of the chord 146. The chord 146 may also include a third quartile 162 extending from fifty percent 154 of the chord 146 to seventy-five percent 156 of the chord 146. Furthermore, the chord 146 may include a fourth quartile 164 extending from seventy-five percent 156 of the chord 146 to one hundred percent 150 of the chord 146.

Figure 4:
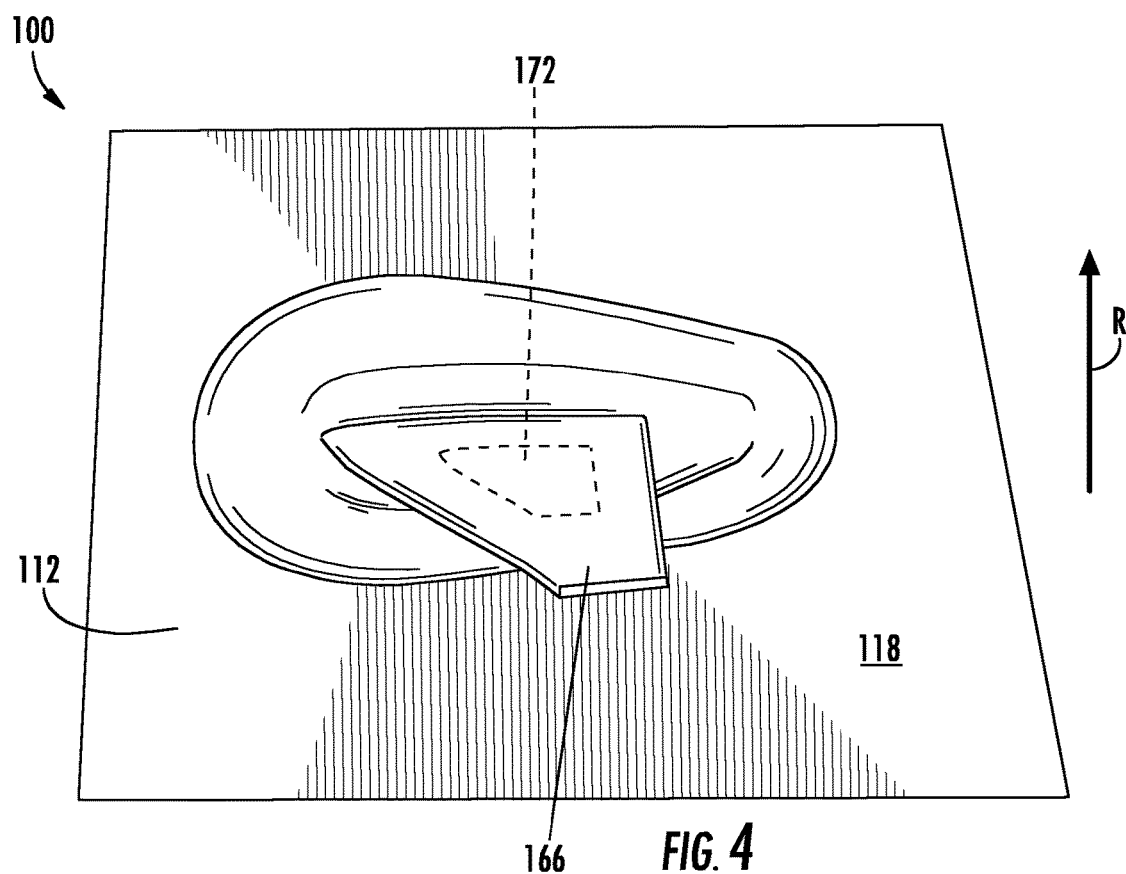
FIG. 4 is an enlarged perspective view of the rotor blade shown in FIG. 2, illustrating a part span shroud in accordance with the embodiments disclosed herein.

Referring now to FIGS. 2 and 4, the rotor blade 100 may include a part span shroud 166, which reduces vibration and axial torsion experienced by the rotor blade 100. As shown, one portion of the part span shroud 166 may extend outward from the pressure-side wall 118. Although not shown, another portion of the part span shroud 166 may extend outward from the suction-side wall 120. In the embodiment shown in FIGS. 2 and 4, the part span shroud 166 has a winglet configuration. Nevertheless, the part span shroud 166 may have a nub and sleeve configuration or any other suitable configuration. Some embodiments of the rotor blade 100 may not include the part span shroud 166.

Figure 5:
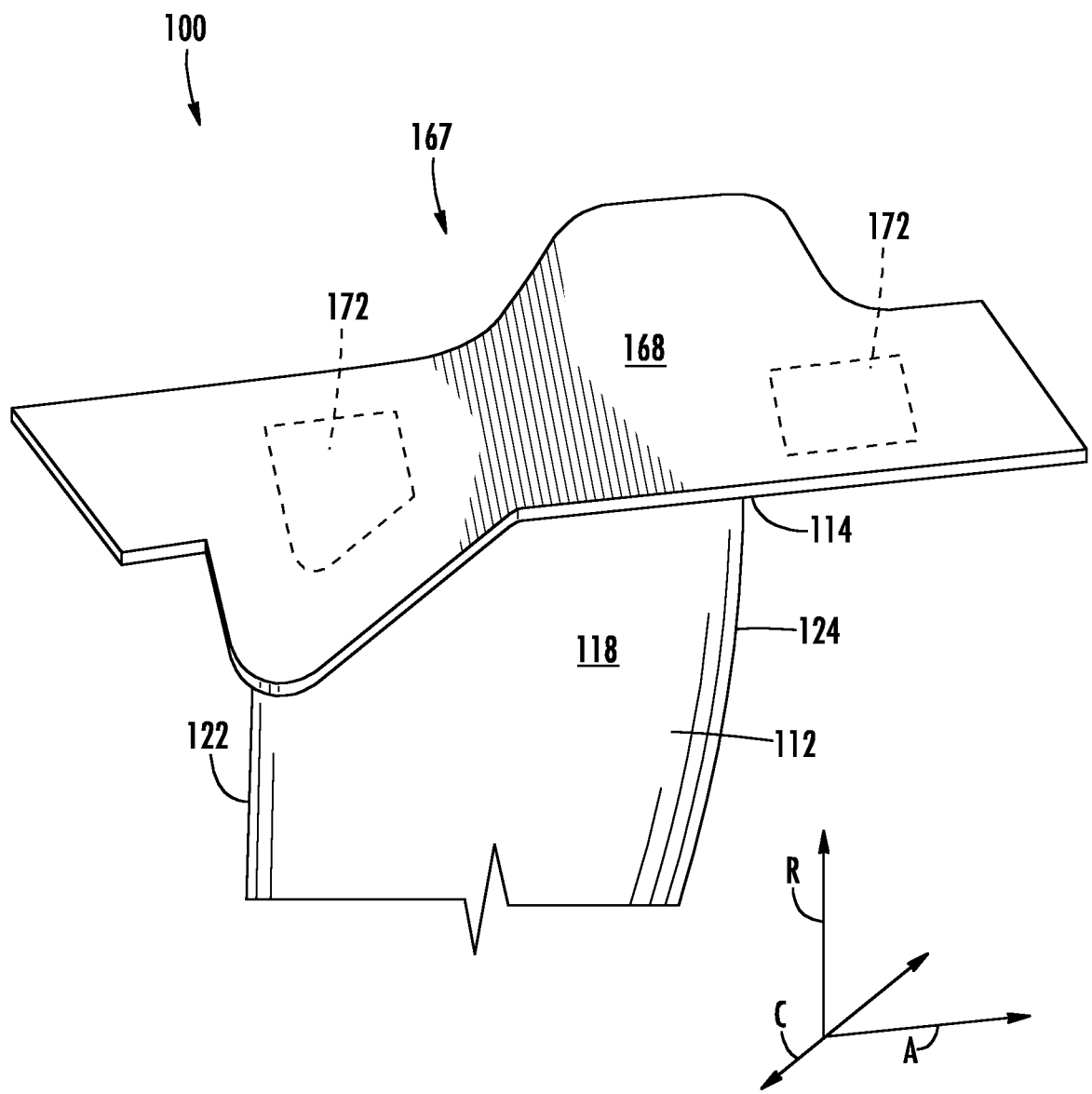
FIG. 5 is an enlarged perspective view of the rotor blade shown in FIG. 2, illustrating a tip shroud in accordance with the embodiments disclosed herein.

As shown in FIGS. 2 and 5, the rotor blade 100 may include a tip shroud 167. More specifically, the tip shroud 167 reduces the amount of the combustion gases 34 (FIG. 1) that escape past the rotor blade 100. In this respect, the tip shroud 167 couples to the tip 114 (i.e., the radially outer end) of the airfoil 112. As such, the tip shroud 167 is positioned at one hundred percent 130 of the span 126. Accordingly, the tip shroud 167 generally defines the radially outermost portion of the rotor blade 100. As shown, the tip shroud 167 includes a radially outer surface 168. Some embodiments of the tip shroud 167 may include one or more rails extending outward from the radially outer surface 168. Furthermore, some embodiments of the rotor blade 100 may not include the tip shroud 167.

The rotor blade 100 also includes one or more particle-filled dampers 172. As will be discussed in greater detail below, the particle-filled dampers 172 may dissipate vibrational energy in the rotor blade 100, thereby reducing fluttering, fretting, shingling, and other unwanted vibrations in the rotor blade 100. In this respect, the rotor blade 100 may include one particle-filled damper 172, two particle-filled dampers 172, or three or more particle-filled dampers 172. In fact, the rotor blade 100 may include any suitable number of particle-filled dampers 172.

FIG. 2 illustrates various locations along the span 126 where the particle-filled dampers 172 may be positioned. In one embodiment, for example, one or more particle-filled dampers 172 may be positioned within the airfoil 112 between fifty percent 134 of the span 126 and one hundred percent 134 of the span 126. More particularly, one or more particle-filled dampers 172 may be positioned within the airfoil 112 between fifty percent 134 of the span 126 and seventy-five percent 136 of the span 126 and/or between seventy-five percent 136 of the span 126 and one hundred percent 130 of the span 126. One or more particle-filled dampers 172 may also be positioned within the airfoil 112 between twenty-five percent 132 of the span 126 and seventy-five percent 136 of the span 126. Although, the particle-filled dampers 172 may be positioned within the airfoil 112 at any suitable position along the span 126.

FIG. 3 illustrates various locations along the chord 146 where the particle-filled dampers 172 may be positioned. In one embodiment, for example, one or more particle-filled dampers 172 may be positioned within the airfoil 112 between fifty percent 154 of the chord 146 and one hundred percent 150 of the chord 146. More particularly, one or more particle-filled dampers 172 may be positioned within the airfoil 112 between fifty percent 154 of the chord 146 and seventy-five percent 156 of the chord 146 and/or between seventy-five percent 156 of the chord 146 and one hundred percent 150 of the span 146. One or more particle-filled dampers 172 may also be positioned within the airfoil 112 between zero percent 148 of the chord 146 and fifty percent 154 of the chord 146. Although, the particle-filled dampers 172 may be positioned within the airfoil 112 at any suitable position along the chord 146.

The particle-filled dampers 172 may be positioned within other components of the rotor blade 100. As shown in FIG. 4, for example, the particle-filled dampers 172 may be positioned within the part span shroud 166. The particle-filled dampers 172 may also be positioned within the tip shroud 167 as illustrated in FIG. 5.

In particular embodiments, one or more particle-filled dampers 172 may be positioned within the airfoil 112 between fifty percent 134 of the span 126 and one hundred percent 134 of the span 126 and between fifty percent 154 of the chord 146 and one hundred percent 150 of the chord 146. More specifically, one or more particle-filled dampers 172 may be positioned within the airfoil 112 between fifty percent 134 of the span 126 and seventy-five percent 136 of the span 126 and between seventy-five percent 156 of the chord 146 and one hundred percent 150 of the chord 146. These regions of the airfoil 112 generally experience the greatest vibrational amplitudes during operation of the gas turbine engine 10. In this respect, placing one or more particle-filled dampers 172 in these regions reduces the largest vibrational amplitudes experienced by airfoil 112, thereby providing the greatest reduction in the fluttering, fretting, shingling, and/or other unwanted vibrations of the rotor blade 100.

Figure 11:
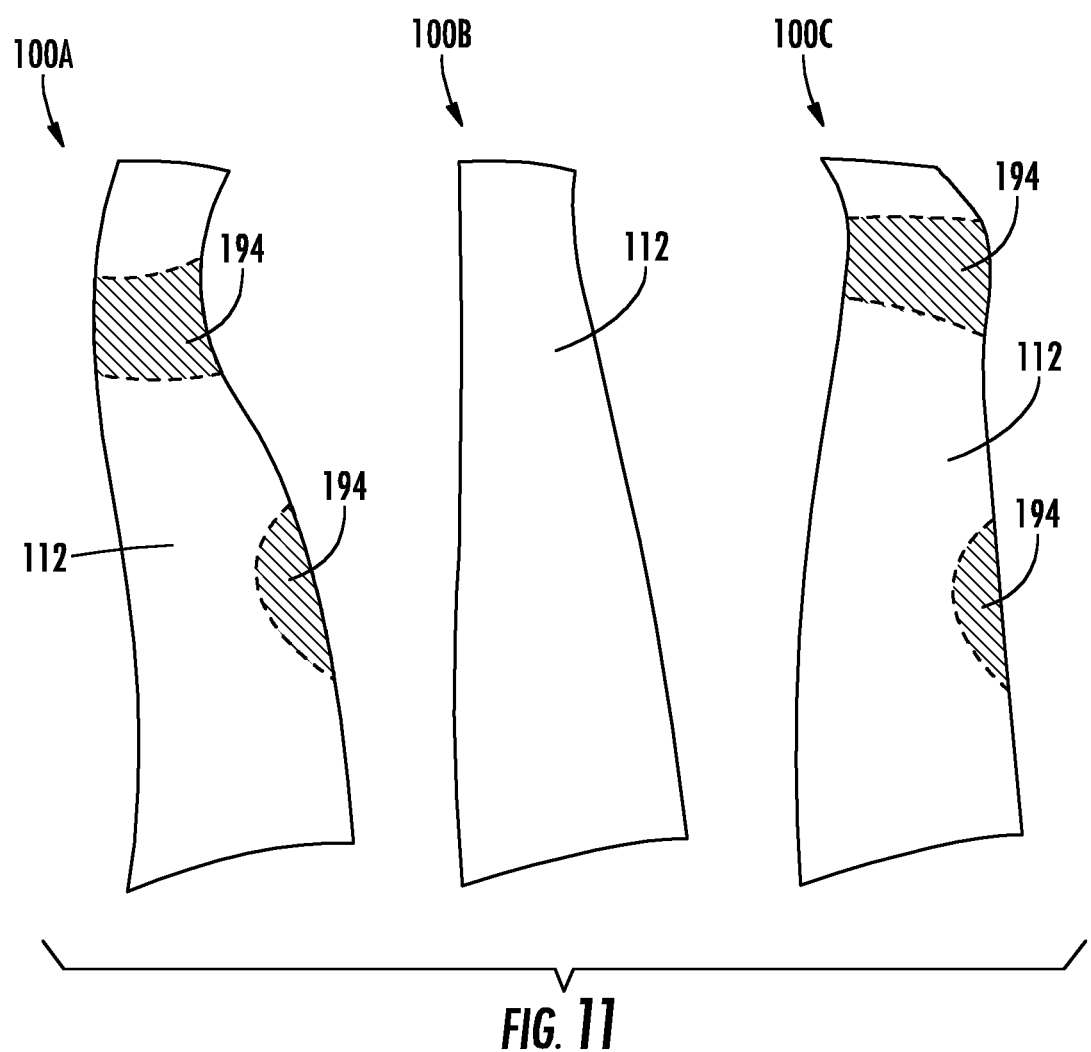
FIG. 11 is a side view of the rotor blade shown in FIGS. 2-5, illustrated a vibrational mode therein in accordance with the embodiments disclosed herein.

Referring now to FIG. 11, an exemplary vibrational mode of the rotor blade 100 is represented by rotor blades 100A, 100B and 100C. More specifically, the rotor blade 100B represents an undeflected shape, while the rotor blades 100A, 100C represent extremum amplitudes of the vibrational mode. The vibrational amplitudes shown in the rotor blades 100A, 110C exaggerated for the purposes of illustration. In some embodiments, the frequency of the vibrational mode may be greater than about 500 Hertz. Locations 194 of the rotor blades 100A, 100C represent locations of the largest vibrational amplitudes experienced by the rotor blade 100 for the illustrated vibrational mode. In this respect, placing one or more particle-filled dampers 172 in locations 194 can reduce vibrational displacements in the rotor blade 100 in the locations 194, thereby suppressing the vibrational mode. In general, the locations 194 may correspond to one or more locations along the span 126 and/or the chord 146 where the particle-filled dampers 172 may be placed as described above. Embodiments are not limited to the vibrational mode illustrated in FIG. 11. Other vibrational modes with largest vibrational amplitudes in other locations are within the scope of the present disclosure.

As indicated above, some embodiments of the rotor blade 100 may include multiple particle-filled dampers 172. In this respect, one or more particle-filled dampers 172 may be positioned within the airfoil 112, such as in the positions described above, and one or more particle-filled dampers 172 may be positioned within other components of the rotor blade 100, such as within the part span shroud 166 and/or the tip shroud 167. In embodiments where multiple particle-filled dampers 172 are positioned within the airfoil 112, the particle-filled dampers 172 may be spaced apart along the span 126 as shown in FIG. 2 and/or along the chord 146 as shown in FIGS. 2 and 3. In one embodiment, for example, one particle-filled damper 172 may be positioned between zero percent 148 of the chord 146 and fifty percent 154 of the chord 146 and another particle-filled damper 172 may be positioned between fifty percent 154 of the chord 146 and one hundred percent 150 of the chord 146. In another embodiment, for example, one particle-filled damper 172 may be positioned between twenty-five percent 132 of the span 126 and seventy-five percent 136 of the span 126 and another particle-filled damper 172 may be positioned between seventy-five percent 136 of the span 126 and one hundred percent 130 of the span 146. Although, any number of particle-filled dampers 172 may be positioned in any one or combination of positions within the rotor blade 100 as described above.

Figure 6:
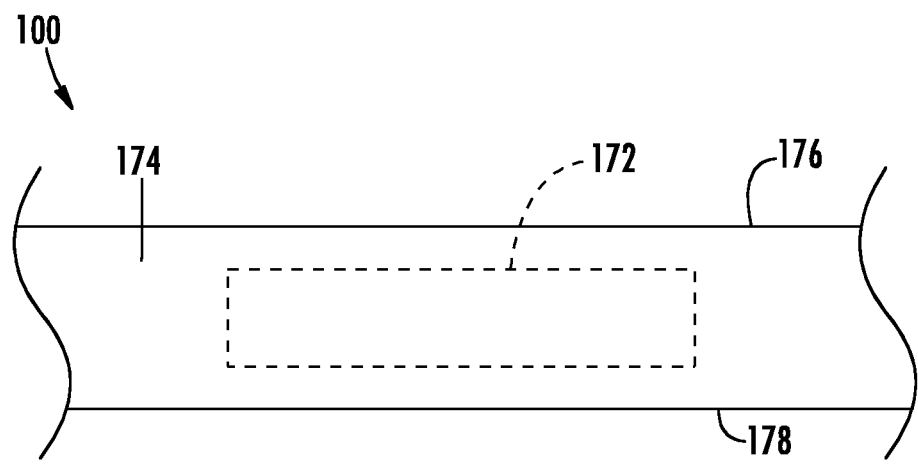
FIG. 6 is side view of an embodiment of a wall of the rotor blade having a particle-filled damper incorporated therein in accordance with the embodiments disclosed herein.
Figure 7:
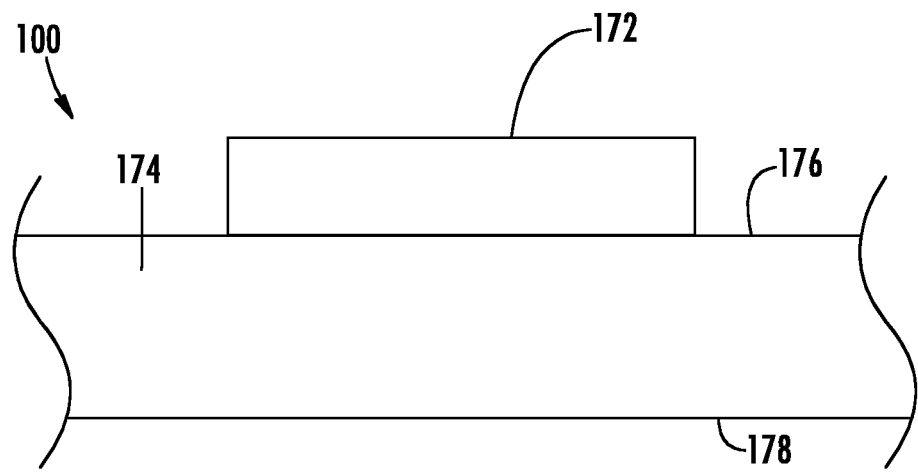
FIG. 7 is side view of another embodiment of a wall of the rotor blade having a particle-filled damper incorporated therein in accordance with the embodiments disclosed herein.

FIGS. 6 and 7 illustrate different manners in which the particle-filled dampers 172 may be integrated into the rotor blade 100. More specifically, FIGS. 6 and 7 illustrate a wall 174 having an inner surface 176 and an outer surface 178. In general, the wall 174 may correspond to the pressure-side wall 118, the suction-side wall 120, a wall forming the part span shroud 166, a wall forming the tip shroud 167, or any other wall in the rotor blade 100 into which the particle-filled dampers 176 may be integrated. In this respect, the outer surface 176 may be an outer surface of the rotor blade 100, such as the pressure-side surface 119 or the suction-side surface 121. The inner surface 174 may be an inner surface of the rotor blade 100, such as an inner surface of the pressure-side wall 118 or the suction-side wall 120 defining the cavity 125. As shown in FIG. 6, the particle-filled dampers 172 may be positioned within the wall 174 (i.e., between the inner and outer surfaces 176, 178). For example, the particle-filled dampers 172 may be cast into the wall 174. The particle-filled dampers 172 may also be coupled (e.g., via welding or brazing) to the inner surface 176 of the wall 174 as shown in FIG. 7.

Figure 8:
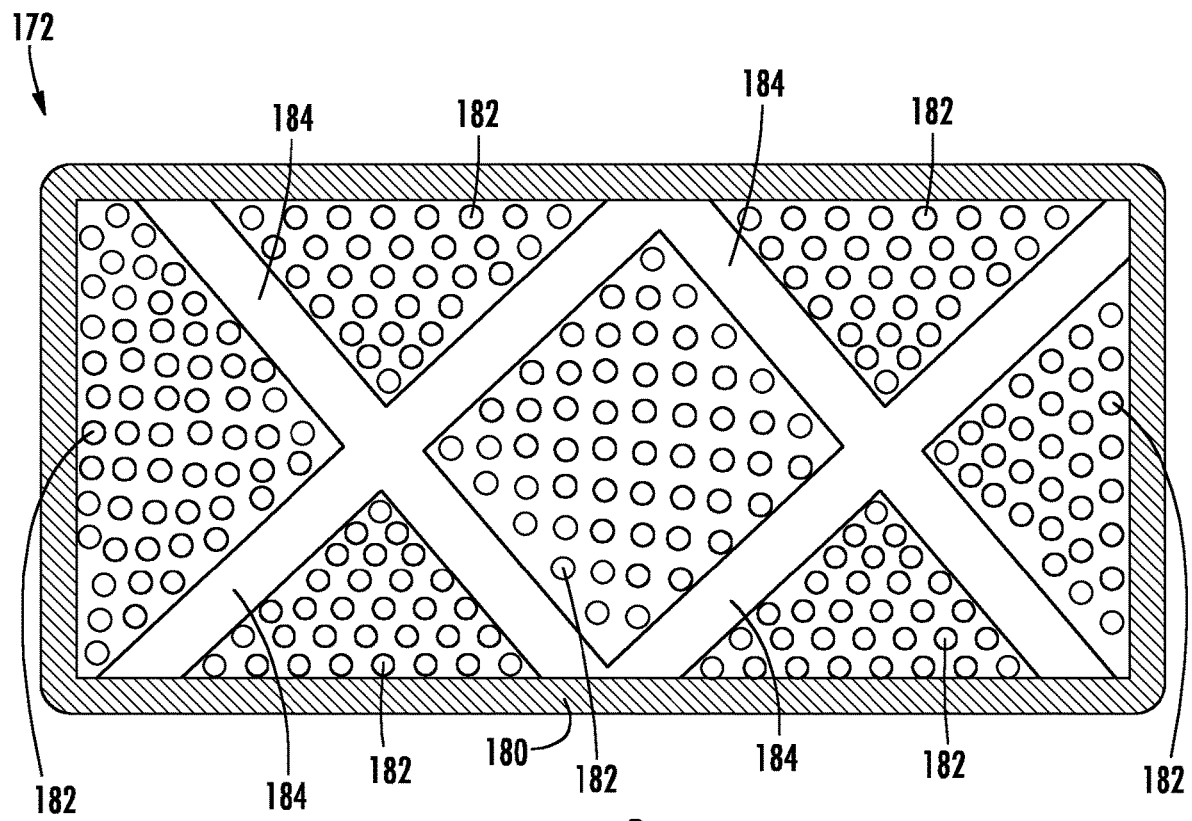
FIG. 8 is a cross-sectional view of an embodiment of the particle-filled damper in accordance with the embodiments disclosed herein.

FIG. 8 illustrates an embodiment of the particle-filled damper 172. As shown, the particle-filled damper 172 includes a housing 180 filled with a plurality of particles 182. The friction resulting from the relative movement between the particles 182 within the housing dissipates the aeromechanical energy within the rotor blade 100, thereby reducing the amplitude of the vibrations of the rotor blade 100. In exemplary embodiments, the particles 182 may be formed from a high temperature material (e.g., tungsten) and may have a diameter of less than one millimeter. Nevertheless, the particles 182 may be formed from any suitable material and have any suitable size. The housing 180 may be entirely filled or partially filled (e.g., eighty percent to ninety-nine percent by volume) with the particles 182. In some embodiments, the housing 180 may contain the particles 182 and a liquid metal (not shown). The particle-filled dampers 172 may optionally include ribs 184 for structural support.

In the embodiment shown in FIG. 8, the particle-filled dampers 172 are formed via additive manufacturing. As used herein, the term "additive manufacturing" as used herein refers to any process which results in a useful, three-dimensional object and includes a step of sequentially forming the shape of the object one layer at a time. Additive manufacturing processes include three-dimensional printing (3DP) processes, laser-net-shape manufacturing, direct metal laser sintering (DMLS), direct metal laser melting (DMLM), plasma transferred arc, freeform fabrication, etc. A particular type of additive manufacturing process uses an energy beam, for example, an electron beam or electromagnetic radiation such as a laser beam, to sinter or melt a powder material. Additive manufacturing processes typically employ metal powder materials or wire as a raw material.

In embodiments where the particle-filled dampers 172 are formed via additive manufacturing, the particles 182 are placed in the housing 180 as the housing and the ribs 184 (if included) are formed. In this respect, the housing 180 and the ribs 184 (if included) may be integrally formed.

Figure 9:
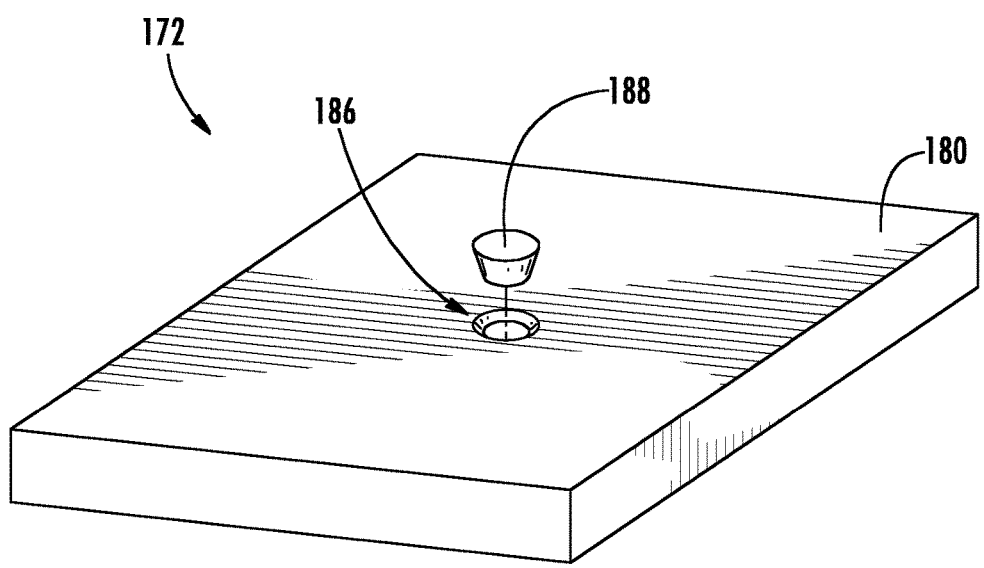
FIG. 9 is a perspective view of another embodiment of the particle-filled damper in accordance with the embodiments disclosed herein.

FIG. 9 illustrates an alternate embodiment of the particle-filled damper 172. In the embodiment shown, the housing 180 defines an aperture 186 through which the particles 182 may enter the housing 180. In such embodiments, the particles 182 may be placed in the housing 180 upon completion of manufacturing the housing 180. A plug 188 may be positioned in the aperture 186 after the particles 182 are placed in the housing 180. The housing 180 may be positioned in or otherwise integrated into ceramic matric composite components to provide damping thereto.

Figure 10:
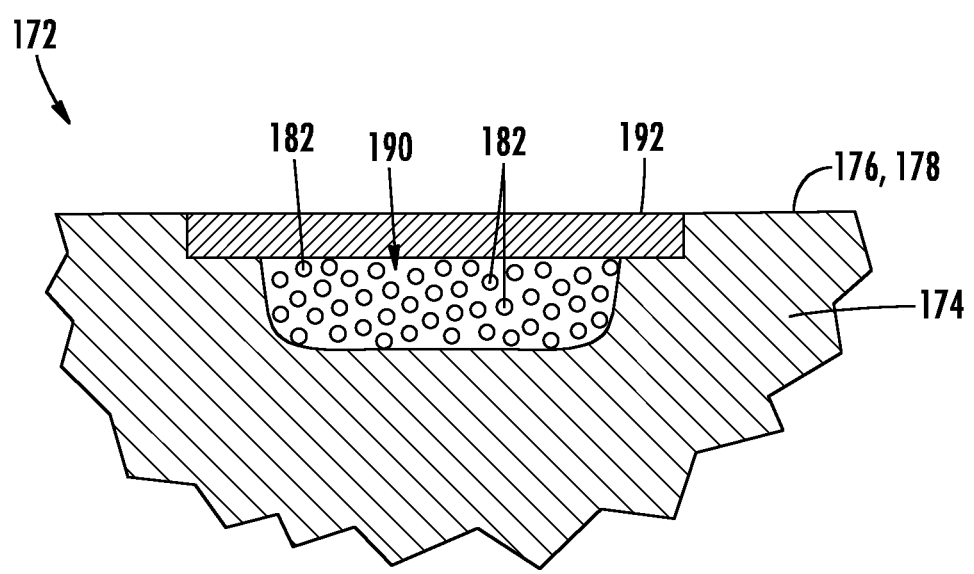
FIG. 10 is a cross-sectional view of a further embodiment of the particle-filled damper in accordance with the embodiments disclosed herein.

FIG. 10 illustrates a further embodiment of the particle-filled damper 172. As shown, the wall 174 may define a cavity 190 therein. The cavity 190 may extend into the wall 174 from either inner surface 176 or the outer surface 178. The plurality of particles 182 may then be placed in the cavity 190. A cover 192 may be placed over the cavity 190 to retain the particles within the cavity 190. The cover 192 may be welded or brazed to the inner or outer surfaces 176, 178.

As discussed in greater detail above, the rotor blade 100 includes one or more particle-filled dampers 172 positioned therein to dissipate aeromechanical energy. In particular embodiments, the particle-filled dampers 172 may be positioned in the regions of the rotor blade 100 experiencing the greatest vibrational amplitudes. In this respect, one or more particle-filled dampers 172 may be positioned between fifty percent 154 of the chord 146 and one hundred percent 150 of the chord 146. More particularly, one or more particle-filled dampers 172 may be positioned within the airfoil 112 between fifty percent 134 of the span 126 and one hundred percent 134 of the span 126 and between fifty percent 154 of the chord 146 and one hundred percent 150 of the chord 146. The use of the particle-filled dampers 172 within the rotor blade 100 in such regions reduces fluttering, fretting, shingling, and/or other aeromechanical issues. As such, the rotor blade 100 does not have the same size limitations that conventional rotor blades have.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A rotor blade for a turbomachine, comprising:
    an airfoil including a leading edge, a trailing edge, a root, and a tip, the airfoil defining a chord extending from the leading edge to the trailing edge and a span extending from the root to the tip;
    a tip shroud coupled to the tip of the airfoil, or a part span shroud coupled to a pressure-side wall or a suction-side wall of the airfoil;
    a first particle-filled damper positioned within the airfoil between fifty percent of the chord and one hundred percent of the chord; and
    a second particle-filled damper positioned within the tip shroud or the part span shroud, between a radially inner surface of either the tip shroud or the part span shroud and a radially outer surface of either the tip shroud or the part span shroud.

2. The rotor blade of claim 1, wherein the first particle-filled damper is positioned within the airfoil between seventy-five percent of the chord and one hundred percent of the chord.

3. The rotor blade of claim 1, wherein the first particle-filled damper is positioned within the airfoil between fifty percent of the span and one hundred percent of the span.

4. The rotor blade of claim 3, wherein the first particle-filled damper is positioned within the airfoil between seventy-five percent of the span and one hundred percent of the span.

5. The rotor blade of claim 1, wherein the first particle-filled damper is positioned within the airfoil between seventy-five percent of the chord and the one hundred percent of the chord and between fifty percent of the span and seventy-five percent of the span.

6. The rotor blade of claim 1, further comprising:
a third particle-filled damper positioned within the airfoil, the third particle-filled damper being spaced apart from the first particle-filled damper along the span or the chord.

7. The rotor blade of claim 6, wherein the third particle-filled damper is positioned within the airfoil between fifty percent of the chord and the one hundred percent of the chord and between twenty-five percent of the span and seventy-five percent of the span.

8. The rotor blade of claim 1, further comprising:
a third particle-filled damper positioned within the airfoil between zero percent of the chord and the fifty percent of the chord.

9. The rotor blade of claim 1, wherein at least one of the first particle-filled damper or the second particle-filled damper comprises a housing, a plurality of particles contained within the housing, and a plurality of ribs within the housing.

10. The rotor blade of claim 1, further comprising:
a third particle-filled damper positioned within the airfoil and spaced apart from the first particle-filed damper along the span.

11. A turbomachine, comprising:
a compressor section;
a combustion section; and
a turbine section including one or more rotor blades, each rotor blade comprising:
an airfoil including a leading edge, a trailing edge, a root, and a tip, the airfoil defining a chord extending from the leading edge to the trailing edge and a span extending from the root to the tip;
a tip shroud coupled to the tip of the airfoil, or a part span shroud coupled to a pressure-side wall or a suction-side wall of the airfoil;
a first particle-filled damper positioned within the airfoil between fifty percent of the chord and one hundred percent of the chord; and
a second particle-filled damper positioned within the tip shroud or the part span shroud, between a radially inner surface of either the tip shroud or the part span shroud and a radially outer surface of either the tip shroud or the part span shroud.

12. The turbomachine of claim 11, wherein the first particle-filled damper is positioned within the airfoil between seventy-five percent of the chord and one hundred percent of the chord.

13. The turbomachine of claim 11, wherein the first particle-filled damper is positioned within the airfoil between fifty percent of the span and one hundred percent of the span.

14. The turbomachine of claim 13, wherein the first particle-filled damper is positioned within the airfoil between seventy-five percent of the span and one hundred percent of the span.

15. The turbomachine of claim 11, wherein the first particle-filled damper is positioned within the airfoil between seventy-five percent of the chord and one hundred percent of the chord and between fifty percent of the span and seventy-five percent of the span.

16. The turbomachine of claim 11, further comprising:
a third particle-filled damper positioned within the airfoil, the third particle-filled damper being spaced apart from the first particle-filled damper along the span or the chord.

17. The turbomachine of claim 16, wherein the third particle-filled damper is positioned within the airfoil between fifty percent of the chord and one hundred percent of the chord and between twenty-five percent of the span and seventy-five percent of the span.

18. The turbomachine of claim 11, further comprising:
a third particle-filled damper positioned within the airfoil between zero percent of the chord and fifty percent of the chord.

19. The turbomachine of claim 11, wherein at least one of the first particle-filled damper or the second particle-filled damper comprises a housing, a plurality of particles contained within the housing, and a plurality of ribs within the housing.

20. The turbomachine of claim 11, further comprising:
a third particle-filled damper positioned within the airfoil and spaced apart from the first particle-filed damper along the span.

* * * * *